June 3, 1941.   M. MORGAN   2,244,499
ROLLING MILL
Filed July 25, 1938

INVENTOR
MYLES MORGAN
BY Albert G. Blodgett
ATTORNEY

Patented June 3, 1941

2,244,499

UNITED STATES PATENT OFFICE 2,244,499

ROLLING MILL

Myles Morgan, Worcester, Mass., assignor to Morgan Construction Company, Worcester, Mass., a corporation of Massachusetts Application July 25, 1938, Serial No. 221,061

5 Claims. (Cl. 80—56)

This invention relates to rolling mills for the rolling of metal bars, sheets and the like, and more particularly to the construction of a mechanism for supporting and adjusting the rolls of such mills.

Rolling mill rolls are usually provided at their opposite ends with necks which are rotatably supported in suitable bearings, the bearings being mounted in the mill housings. The bearings for one of the rolls are slidable in the housings so that the roll can be adjusted in a direction perpendicular to its axis for the purpose of controlling the dimensions of the rolled product. For this purpose it is customary to provide a pair of adjustable screws which are rotatably mounted in the housings in position to resist the tendency of the bearings to move under the influence of the tremendous pressures arising from the rolling action. Usually metal blocks, known as "breaker blocks," are placed between the ends of the screws and the bearing casings. The roll deflects slightly as a result of the rolling pressure, and this tends to cramp the roll-neck bearings. In order to avoid this cramping effect, it is a common practice to form each breaker block and the end of the cooperating screw with interfitting spherical surfaces, one of which is convex and the other of which is concave, with the expectation that the bearing will align itself properly with the roll axis. Such alignment, however, involves a sliding of one of the spherical surfaces over the other, and it is a fact that in actual rolling mill practice the rolling pressures are so high and the resultant friction between the contacting spherical surfaces is so great as to preclude any such sliding of these surfaces. Consequently with these prior constructions the bearings have become so badly cramped by reason of roll deflection as to cause a substantial increase in the power consumption, and in some cases serious damage to the various parts of the bearings. Various other schemes have been proposed to avoid cramping of the bearings, but in general these prior arrangements have proven to be unsuccessful and impractical when applied to an actual machine.

It is accordingly one object of the invention to overcome these difficulties and to provide a rolling mill having a simple and inexpensive mechanism for supporting and adjusting one roll thereof, this mechanism to be so constructed and arranged that the roll may deflect freely under the rolling pressure without cramping the roll-neck bearings.

It is a further object of the invention to provide a rolling mill having axially adjustable screws to control the positions of the roll neck bearings, together with means to transmit heavy rolling pressures from the bearings to the screws and at the same time allow the bearings to align themselves properly with the roll regardless of roll deflection.

With these and other objects in view, as will be apparent to those skilled in the art, the invention resides in the combination of parts set forth in the specification and covered by the claims appended hereto.

Referring to the drawing illustrating one embodiment of the invention and in which like reference numerals indicate like parts, Fig. 1 is a fragmentary end elevation of a rolling mill;

Figure 1:
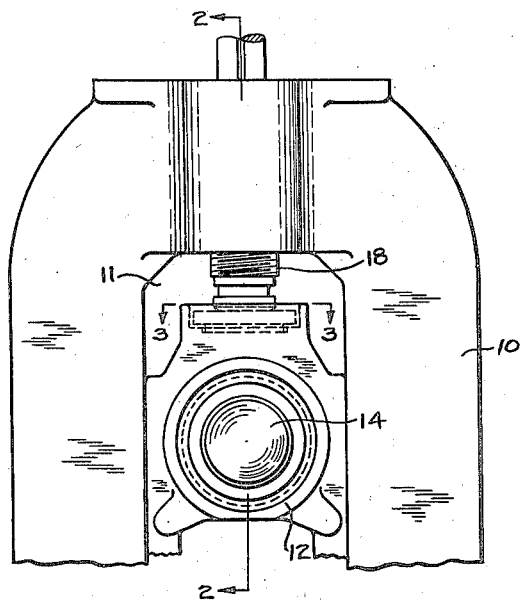
Figure 2:
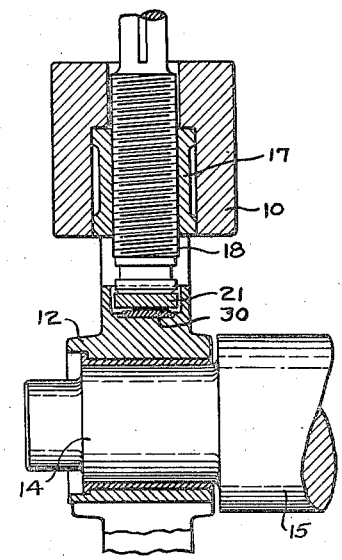
Fig. 2 is a section on the line 2—2 of Fig. 1.

The embodiment illustrated comprises an upright housing 10 of usual construction having a window 11 for the reception of a suitable roll-neck bearing 12. This bearing serves to support one neck 14 of a rotatable horizontal roll 15, and it will be understood that a similar construction is provided at the other end of the roll. The roll 15 is the top roll of the mill, which may be of the two-high, three-high or four-high types. The bearing 12 is slidable vertically in the window 11, and in order to limit the upward movement of the bearing under the influence of the rolling pressure there is secured in the upper portion of the housing 10 a nut 17 through which there extends a vertical screw 18. Any suitable means (not shown) may be provided for rotating the screw 18 either by power or manually, so that the bearing 12 may be adjusted vertically.

Figure 3:
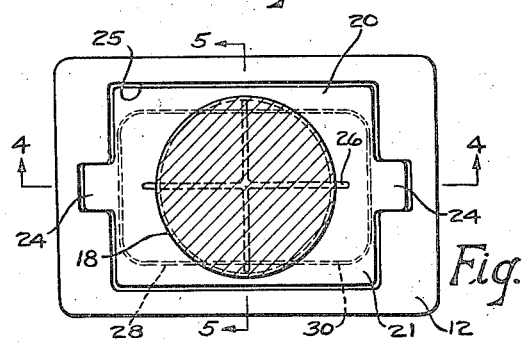
Fig. 3 is an enlarged section on the line 3—3 of Fig. 1.
Figure 5:
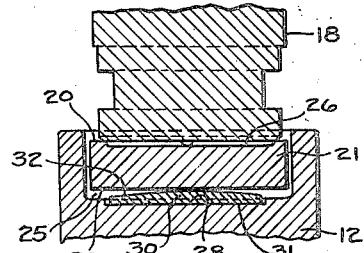
Fig. 5 is a section on the line 5—5 of Fig. 3.
Figure 4:
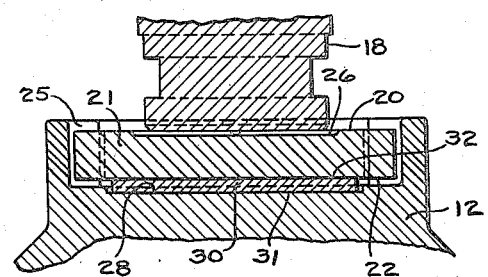
Fig. 4 is a section on the line 4—4 of Fig. 3.

The lower end of the screw 18 is formed with a plane surface perpendicular to the axis of the screw, and this surface engages the upper plane horizontal surface 20 of a block 21 located directly therebeneath. The lower surface 22 of this block is likewise plane, and parallel with the upper surface 20. The block 21 is generally rectangular in plan, as shown in Fig. 3, and provided at each of its ends with a lug 24. The top of the bearing 12 is formed with a shallow pocket 25 to receive the block 21, this pocket being of the same shape as the block in plan, with sufficient clearance around the periphery thereof to avoid the necessity for machining the pocket. The lugs 24 preferably fit rather closely in the corresponding portions of the pocket, it being the purpose of these lugs to prevent the block from turning as the screw 18 is rotated. Grooves 26 may be provided in the upper surface 20 of the block to facilitate the introduction of lubricant between the screw and the block to reduce friction and wear.

At the bottom of the pocket 25 there is provided a shallow recess 28 generally rectangular in plan, with its corners well rounded to facilitate machining thereof. The bottom of this recess is a horizontal plane surface. Within the recess 28 there is mounted a comparatively thin plate 30 having a plane lower surface 31 in contact with the bottom of the recess. This plate is of the same shape as the recess in plan, with a slight clearance around the periphery of the plate. The upper surface 32 of the plate is convex and shaped as a portion of a cylinder of comparatively large radius, with the axis of the cylinder perpendicular to the vertical plane defined by the axis of the screw 18 and the axis of the roll 15. This convex cylindrical surface 32 extends above the bottom of the pocket 25 and contacts with the plane lower surface 22 of the block 20, this contact taking place along a horizontal line which extends parallel to the direction of travel of the stock through the rolling mill.

It will now be apparent that in the operation of the rolling mill the pressure resulting from the rolling action will tend to elevate the roll 15, and as a consequence an upward force will be imparted to the bearing 12. This force, which may be of great magnitude, will be transmitted upwardly through the plate 30 and the block 21 to the screw 18, and thus to the nut 17 and the housing 10. As the roll 15 deflects upwardly by reason of the rolling pressure, the plate 30 will rock slightly on the lower surface 22 of the block 21, allowing the bearing 12 to remain in correct alignment with the roll neck 14 despite the slight inclination of the axis of the roll neck caused by the deflection of the roll. Since this rocking or rolling of the plate 30 on the block 21 takes place without relative sliding movement between these parts, very little friction is involved, and there is no appreciable tendency to cramp the bearing on the roll neck. While line contact exists between the plate 30 and the block 21 under zero load conditions, the effect is by no means that of a knife-edge bearing, in which the stress concentration is so great as to preclude the transmission of heavy loads. The construction disclosed herein is well adapted for use in mills with enormous screw-down pressures, since under operating conditions the plate 30 and the block 21 will be compressed by the forces applied thereto, and because of the large radius of curvature of the cylindrical surface 32 the deformation resulting from this compression will widen the actual area of contact sufficiently to prevent the unit stresses which are applied to the contacting parts from exceeding safe limits. Furthermore, as the screw 18 is rotated to adjust the bearing vertically, the block 21 is prevented from turning by the engagement of the lugs 24 with the adjacent portions of the pocket 25. Hence there will be no sliding or rubbing of the block 21 over the cylindrical surface 32 to cause wear and eventually produce a flat area thereon. The construction is comparatively simple, compact and inexpensive, and well adapted for use with rolling mills of existing types.

Having thus described my invention, what I claim as new and desire to secure by Letters Patent is:

1. A rolling mill comprising a slidably mounted roll-neck bearing, a rotatable screw having one end located adjacent the bearing, a block engaging the end of the screw, means on the bearing arranged to prevent the block from turning as the screw is rotated, and a plate located between the bearing and the block, the block and the plate having adjacent surfaces shaped to contact along a line extending transversely of the axis of the bearing, the axes of the screw and bearing being substantially perpendicular and in a common plane.

2. A rolling mill comprising a slidably mounted roll-neck bearing, a rotatable screw having one end located adjacent the bearing, a block engaging the end of the screw, means on the bearing arranged to prevent the block from turning as the screw is rotated, and a plate located between the bearing and the block, the block and the plate having adjacent surfaces one of which is a plane surface perpendicular to the axis of the screw and the other of which is a convex cylindrical surface of comparatively large radius having its axis transverse to the axis of the bearing, the axes of the screw and bearing being substantially perpendicular and in a common plane.

3. A rolling mill comprising a slidably mounted roll-neck bearing, a rotatable screw having one end located adjacent the bearing, the said end of the screw having a plane surface perpendicular to the axis of the screw, a block having two parallel plane surfaces one of which engages the plane surface on the screw, means on the bearing arranged to prevent the block from turning as the screw is rotated, and a comparatively thin plate located between the bearing and the block, the plate being formed with a convex cylindrical surface of comparatively large radius having its axis transverse to the axis of the bearing, the said convex surface being in contact with the other plane surface on the block, the axes of the screw and bearing being substantially perpendicular and in a common plane.

4. A rolling mill comprising a slidably mounted roll-neck bearing, a rotatable screw having one end located adjacent the bearing, the said end of the screw having a plane surface perpendicular to the axis of the screw, the bearing having a plane surface parallel to and spaced from the plane surface on the end of the screw, a comparatively thin plate having on one side a plane surface which contacts with the plane surface on the bearing and on the other side a convex cylindrical surface of comparatively large radius having its axis transverse to the axis of the bearing, a block mounted between the plate and the screw and having two parallel plane surfaces which contact respectively with the end of the screw and with the cylindrical surface of the plate, and means on the bearing arranged to prevent the block from turning as the screw is rotated, the axes of the screw and bearing being substantially perpendicular and in a common plane.

5. A rolling mill comprising a slidably mounted roll-neck bearing, a rotatable screw having one end located adjacent the bearing, the said end of the screw having a plane surface perpendicular to the axis of the screw, the bearing having a pocket open toward the screw and a recess in the pocket having a plane surface parallel to the plane surface on the end of the screw, a comparatively thin plate mounted in the recess, the plate having on one side a plane surface which contacts with the plane surface in the recess and on the other side a convex cylindrical surface of comparatively large radius having its axis transverse to the axis of the bearing, and a block mounted in the pocket and having two parallel plane surfaces one of which is in contact with the end of the screw and the other of which is in contact with the cylindrical surface of the plate, the pocket being shaped to prevent the block from turning as the screw is rotated, the axes of the screw and bearing being substantially perpendicular and in a common plane.

MYLES MORGAN.